UNITED STATES PATENT OFFICE.

CARLETON ELLIS, OF MONTCLAIR, NEW JERSEY, ASSIGNOR TO ELLIS-FOSTER CO., A CORPORATION OF NEW JERSEY.

NON-DUSTING CEMENT CONCRETE FLOOR OR LIKE ARTICLE.

1,383,268.  Specification of Letters Patent.  Patented June 28, 1921.

No Drawing.  Application filed October 2, 1917.  Serial No. 194,314.

*To all whom it may concern:*

Be it known that I, CARLETON ELLIS, a citizen of the United States, and a resident of Montclair, in the county of Essex and State of New Jersey, have invented certain new and useful Improvements in Non-Dusting Cement Concrete Floors or like Articles, of which the following is a specification.

This invention relates to concrete floors and to a composition for treating concrete floors or floors containing lime or other alkali material which affect ordinary saponifiable finishes and paints made with linseed oil, acid resins, saponifiable resins and the like and the invention relates particularly to the use of cumaron resin, or paracumaron, which is a substance usually made by the polymerization of certain constituents of solvent naphtha, principally cumaron and indene, forming a resinous body apparently largely of a hydrocarbon character and substantially unaffected by cement alkali.

According to the present invention cumaron resin or paracumaron is placed in solution preferably without adding any saponifiable oil such as linseed or Chinese wood oil or any substances of that character (although such additions are not precluded) and this solution is applied to the concrete floor either by spraying or brushing to produce a suitable coating or filling of the unsaponifiable resin.

A suitable solution for this purpose may be made by dissolving approximately equal parts of cumaron resin of melting point of say 62° C. in heavy benzin, painters' naphtha, texene, turpalin, or other turpentine substitute. The solution, if cloudy may be filtered so as to produce a clear transparent product free from any undesirable insoluble bodies which are not infrequently present. If the amount of such residue is large the solution may be filtered and then filter pressed or if allowed to stand for a considerable period the clear liquid may be drawn from the top leaving the insoluble product of over-polymerization beneath as a sludge. These products of over-polymerization, etc., are often fairly soluble in benzol and solutions may be obtained therewith, or in some cases by using a mixture of hydrocarbons of the paraffin series such as the heavy benzin mentioned, along with 10 to 25% of benzol, toluol or other similar solvent of the aromatic series. Thus the over-polymerized or other bodies insoluble in the petroleum hydrocarbon are put into solution and a film of this dries to a clear transparent finish.

Preferably somewhat more than 50% of cumaron resin by weight is used in such a composition as thereby a body is secured which does not penetrate too deeply into the concrete floor but gives a suitable surface which is not so excessively hard as to be dangerous from being slippery as would be the case with wax and certain hard resin finishes. Pigments may be added when desired.

One feature of my invention involves the use of cumaron resin having this slightly tacky quality but not sufficiently tacky to attract and retain dust and dirt in any objectionable manner. Ordinarily varnishes drying to leave a slightly tacky surface are considered bad and I believe I am the first to ascertain the utility of cumaron resin, especially the sorts having permanently tacky properties, in this direction.

A further feature of my invention is the use of a solution of cumaron resin free from objectionable amounts of products of over-polymerization or insoluble impurities of an undesirable character so as to produce a desirable finish coating on concrete.

As stated, various departures may be made, such as the use of harder or softer resin, additions of other unsaponifiable or saponifiable resins, drying or non-drying oils, driers, pigments, fillers, abrasives, frictional foothold material such as carborundum, alundum powder, etc., which is a useful addition for the treads of stairs of concrete, 5 to 10% of 20—85 mesh carborundum being recommended. Tack qualities may be obtained from the harder resins by addition of non-drying mineral or other oil, or even by the use of semi-drying oils in some cases. Such materials as oils, etc., since they add to the tacky properties of hard cumaron resins, may be referred to generically as "an agent capable of increasing the tacky properties of cumaron resin."

My invention also comprises a structural mass or aggregate consisting of a non-dusting concrete floor, the upper surface of which is coated and more or less impregnated with a film of cumaron resin. Preferably the floor is left somewhat rough so that the cumaron resin may have the proper anchorage. The concrete may be sufficiently porous so that the cumaron resin penetrates to a short distance. The proportion of the solvent may be varied to adjust the viscosity to give the requisite penetration.

A dark resin melting at 60,—62° is good for surfaces exposed to hard wear, etc.

A harder form of the resin melting at about 75° C. or between 75° and 100° C. may be used in some cases, especially with what is termed a floated finish, that is, one made with a wood trowel in place of a steel trowel. Using a product 75° C. melting point, I find it advisable to make up approximately a 25% solution in a hydrocarbon solvent such as a heavy benzin, texene and the like. Such a solution of 25% strength penetrates the wood-troweled concrete to an effective distance so as to secure a firm hold on the concrete surface layers while at the same time it does not penetrate so deeply as not to leave a suitable surface finish.

The determination of the melting point of many resins is difficult owing to the gradual transition of the solid material to a liquid product. This is noticeable in the case of cumaron resin and the melting point referred to herein is that temperature at which the material in a powdered form or finely-divided condition coalesces in a melting point tube to form a fused adhering mass. This point rather than the temperature at which the resin is in a freely liquid condition is used herein as the melting point.

What I claim is:—

1. A concrete article having a roughened finish and impregnated and superficially coated with a composition comprising hard cumaron resin having a melting point substantially above 75° C., and an agent capable of increasing the tacky properties of cumaron resin.

2. A cement concrete article having a somewhat rough finish and coated with a cumaron resin having a melting point substantially above 75° C.

3. A cement concrete floor coated with a cumaron resin having a melting point substantially above 75° C.

CARLETON ELLIS.